Oct. 29, 1968  S. SPISAK  3,408,472
WELDING TOOL
Filed July 15, 1965
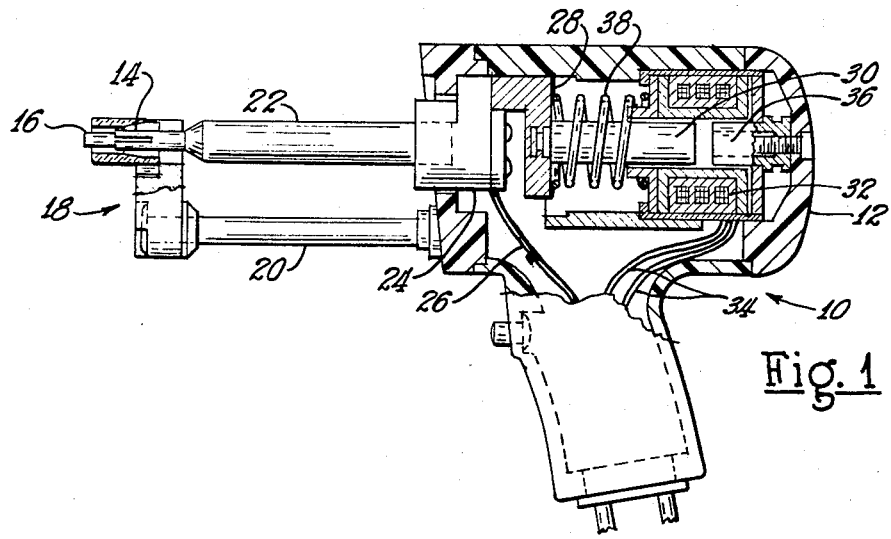
Fig. 1
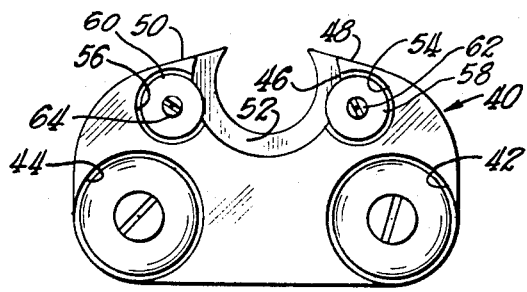
Fig. 2
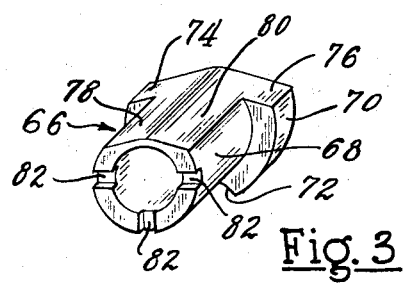
Fig. 3
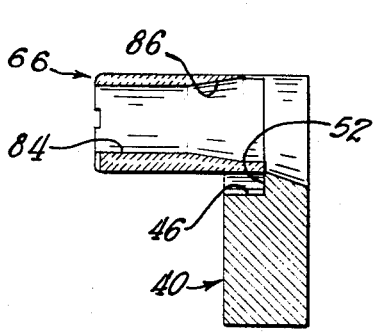
Fig. 4
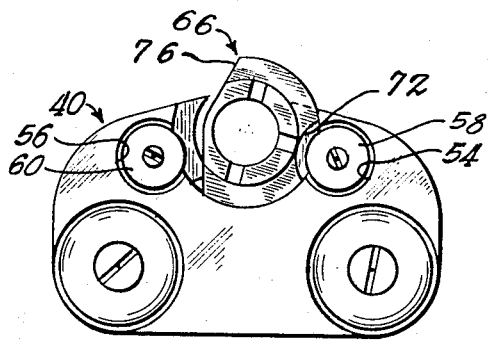
Fig. 5
INVENTOR.
STEVE SPISAK
BY
ATTORNEYS

United States Patent Office 3,408,472
Patented Oct. 29, 1968

3,408,472
WELDING TOOL
Steve Spisak, Elyria, Ohio, assignor to Gregory Industries, Inc., Lorain, Ohio, a corporation of Michigan
Filed July 15, 1965, Ser. No. 472,191
12 Claims. (Cl. 219—98)

ABSTRACT OF THE DISCLOSURE

A novel means for mounting a spark shield in a supporting foot of a stud welding tool is provided. The spark shield has a flange at one end which is received in an opening of the supporting foot and abuts a shoulder therein. The shield is held in the opening by fasteners affixed to the front surface of the supporting foot. The flange has notches therein to clear the fasteners and enable the shield to be removed quickly and easily.

This invention relates to a stud welding tool and particularly to a spark shield assembly for a stud welding tool.

A stud welding tool of the type with which the present invention is concerned is designed to weld studs to a surface by a drawn-arc technique. The tool holds the stud in on-end relationship with respect to the workpiece and then withdraws the stud a predetermined distance from the workpiece. Substantially at the same time that the stud is withdrawn, a first potential is established between the stud and the workpiece to enable a pilot arc to be drawn therebetween. A higher potential is then established between the stud and workpiece to enable a main welding arc to be drawn therebetween and to melt metal on the end of the stud and the workpiece. After a predetermined time, the stud is plunged against the workpiece to complete the weld by joining the pieces and allowing the molten metal to cool and solidify. A spark shield is carried by the stud welding tool and is positioned around the stud during the welding operation. The spark shield has several important functions including to help stabilize the arc, to support the tool against the workpiece as the stud is withdrawn to the position in which the main welding arc is established, and to prevent splatter of the molten metal when the stud is plunged against the workpiece. If not contained, the splattering of the molten metal can mar the adjacent surfaces and even start fires.

When a stud welding tool of the type under consideration is used for high production purposes, the spark shields require relatively frequent replacement because of wear, partial burn-off due to the splatter of molten metal, damage, etc. Further, the spark shields must be capable of being replaced rapidly because of the high production requirements. In other instances, spark shields of welding tools, even though not used in high production applications, may need relatively frequent replacement in order to change the length or diameters of the shields, for example, to fit different studs and different applications.

The present invention is concerned with a spark shield assembly which includes a supporting foot and a spark shield which can be relatively quickly changed when desired. The new assembly also is designed and shaped so as to enable the studs to be welded in close positions, near surfaces extending outwardly from the workpiece, for example.

It is, therefore, a principal object of the invention to provide an improved spark shield assembly for a stud welding tool including a spark shield which can be changed easily and quickly.

Still another object of the invention is to provide a spark shield assembly designed so that a stud can be welded close to a surface protruding from a workpiece.

Other objects and advantages of the invention will be apparent from the following detailed description of a preferred embodiment thereof, reference being made to the accompanying drawings, in which:

FIG. 1 is a view in elevation, with parts broken away and with parts in cross section, of a stud welding tool and a spark shield assembly embodying the invention;

FIG. 2 is a front view in elevation of a supporting foot of the spark shield assembly;

FIG. 3 is a view in perspective of a spark shield of the spark shield assembly;

FIG. 4 is a view in vertical cross section of the spark shield assembly showing the supporting foot and the spark shield in assembled relationship; and FIG. 5 is a front view in elevation of the spark shield assembly showing the spark shield in a position to be removed from the supporting foot.

Referring to FIG. 1, a stud welding tool 10 is used to weld studs to a workpiece in a known manner, such as by an arc welding technique disclosed in Nelson Patent 2,191,494 or in Glorioso Patent 3,136,880, for example. However, the studs also can be welded by the technique disclosed in Graham Patent 2,610,278, for example. The stud welding tool 10 includes a main housing 12 of dielectric material and a chuck 14 located in front of the tool 10. The chuck 14 receives, positions, and holds a stud 16 during a welding operation with the stud and chuck surrounded by a spark shield assembly 18 constructed in accordance with the invention. The spark shield assembly 18, in turn, is supported in a predetermined position at the front of the tool by a pair of adjustable supporting legs 20.

The chuck 14 is attached to a chuck leg 22 which is electrically connected by a cable clamp 24 to a main welding cable 26. A rear cable clamp part 28 is attached to a rear portion of the clamp 24 and is affixed to a movable solenoid core 30 which extends into a lifting and holding coil 32. The core 30 is retracted when current is supplied to the coil 32 through suitable leads 34. An adjustable stop 36 at the rear of the coil determines the distance the core 30 moves and, hence, determines the extent to which the chuck 14 and the stud 16 are retracted from the workpiece. A return or plunge spring 38 returns the stud to the workpiece after a main welding arc has been established between the stud and the workpiece for a predetermined time, and when the current to the coil 32 is shut off. If the length varies from one stud to another, a clutch arrangement can be employed to enable a constant lift or retraction of the stud from the workpiece to be achieved, as is known in the art.

When the stud welding tool 10 is used on a production line, for example, wherein it is employed continuously to weld studs throughout a work day, the spark shield of the tool may require relatively frequent replacement because of wear and partial burning of the end of the shield due to the welding arc and the splatter of molten metal as the stud is plunged against the workpiece. In other instances, frequent replacement of the spark shield is desired in order to change the size or shape of the shield for different applications.

The spark shield assembly 18 is particularly designed for use where the shield is to be replaced relatively frequently or where rapid replacement is desired, or both. Referring more particularly to FIGS. 2–5 the assembly 18 includes a supporting foot 40 which is preferably of a non-conducting material but can also be of metal if insulated from the supporting legs 20. The foot has two recesses 42 and 44 at the lower corner portions therof to receive the connections for the legs 20. Symmetrically located with respect to the recesses 42 and 44, but at the upper edge of the foot 40, is an arcuate opening 46 having a predetermined radius, with the periphery of the opening extending through an included angle of more than 180°. The edge of the supporting foot 40 on each side of the opening 46 slopes away therefrom in straight portions 48 and 50 lying at suitable angles, as in the order of 15°, to a line parallel to a line through the axes of the supporting leg recesses 42 and 44. The opening 46 has a generally annular shoulder 52 facing away from the tool and toward the workpiece. The supporting foot 40 further includes a pair of recesses 54 and 56 in which are discs or flange members 58 and 60 extending beyond the edge of the opening 46. The discs are held by the foot 40 through fasteners or screws 62 and 64. The fasteners are equally spaced from the center of the opening 46 with lines through the fasteners and the center of the opening forming suitable angles, as in the order of 15°, with a line parallel to a line through the axes of the recesses 42 and 44. Lines through the fasteners and the center of the opening 46 also form an included angle of 150°.

A spark shield 66 of a suitable insulating material or of metal, includes, in the specific embodiment shown, a generally cylindrical shield portion 68 and a generally annular flange 70 at one end, the flange having a predetermined radius slightly less than the radius of the opening 46 so as to fit in the opening against the shoulder 52. An edge portion of the flange 70 has a notch or clearance means 72 therein and also has two straight portions 74 and 76 sloping away from a rounded peak diametrically opposite the notch 72. The straight portions 74 and 76 also are at suitable angles, as in the order of 15°, to a line parallel to a line through the axes of the connectors 42 and 44 when the spark shield 66 is symmetrically located in the opening 46 of the foot 40.

The generally cylindrical portion 68 of the spark shield 66 also has a pair of flat areas 78 and 80 sloping away from a rounded peak extending longitudinally of the cylindrical portion and aligned with the peak from which the straight portions 74 and 76 of the flange 62 extend. The flat areas 78 and 80 also lie at the same angles as the straight portions 74 and 76 of the flange. The centers of curvature of the rounded peaks lie at the center of the opening 46 so that the shield 66 will always be at a constant distance from an object extending from the workpiece regardless of what portion of the shield may be in contact with the object. As shown in FIG. 3, the wall of the cylindrical portion 68 at the flat areas is much thinner than the remainder.

The end of the cylindrical portion 68 opposite the flange 70 has a plurality of notches 82 therein which enable the area adjacent the stud 16 to be vented during welding since otherwise excessive pressures will build up around the stud. The notches 82 are known in the art except heretofore they have been generally disposed at equally spaced intervals around the entire spark shield whereas in the present instance, there is no vent in the portion adjacent the flat areas 78 and 80. This prevents the possibility of sparks or molten metal being ejected on the side toward the flat areas where some protruding object of the workpiece may be located and which may be damaged by the sparks or molten metal. A chuck passage 84 extends completely through the spark shield 66 and has a flared portion 86 at the end toward the flange 70 to assure clearance for the chuck 14.

When the spark shield is to be replaced, it can be quickly removed from the supporting foot 40 simply by loosening the fasteners 62 and 64 at which time the shield 66 is turned 75°, in this instance, to either side in order to align the notch 72 with the end of one of the discs 58 and 60 as shown in FIG. 5. At this time, the straight portion 74 or 76 of the flange 70 will clear the other of the discs so that the shield again can be removed. The straight portions 74 and 76 thus constitute clearance means as equally well as the notch 72.

Not only do the straight portions 74 and 76 of the flange 70 enable removal of the spark shield, but they, in combination with the flat areas 78 and 80 of the cylindrical portion 68 and the straight portions 48 and 50 of the supporting foot 40, enable a stud to be welded very close to any projection or protruding object extending from the workpiece to which the stud is welded. It frequently happens that a wall, frame, etc. is affixed to the workpiece adjacent the area to which the stud is to be welded and previously it has been almost physically impossible to weld the stud in the desired position. However, the unique arrangement of the supporting foot 40 and the spark shield 66 enables such a weld to be easily attained. Further, there is no possibility that the projecting part of the workpiece will be damaged by molten metal or sparks since this side of the shield is entirely closed. As mentioned earlier, the studs can be welded at a constant distance from the object by placing the straight portion 74 or 76 or the rounded peak in contact with the object at the time of the weld.

Various modifications of the above-described embodiment of the invention will be apparent to those skilled in the art, and it is to be understood that such modifications can be made without departing from the scope of the invention, if they are within the spirit and tenor of the accompanying claims.

I claim:

1. A spark shield assembly for a stud welding tool comprising a supporting foot including a body having two major, flat surfaces and a peripheral edge, one of said surfaces having spaced corner recesses to receive fastener means for a pair of supporting legs of the stud welding tool, the one surface also having a pair of disc recesses, said foot having an opening in an edge portion of said body positioned symmetrically with respect to said recesses, said opening having an arcuate edge of a predetermined radius extending through an included angle of more than 180° and terminating at the peripheral edge of said foot, said opening having a shoulder around said edge spaced a predetermined distance from the one surface of said body, a pair of discs in said disc recesses having fasteners affixed to said foot at equal distances from the center of said opening and with lines through said fasteners and said center forming angles of 15° with a line through said center and parallel to said corner recesses, said discs having edge portions extending over said opening, said peripheral edge of said foot having straight portions sloping away from said opening at equal angles in the order of 15° with respect to said parallel line through said center of said opening, said spark shield assembly further comprising a spark shield having a generally cylindrical portion and a generally annular flange portion at one end having a radius slightly less than the radius of said opening and fitting in said opening against said shoulder, said flange being held in said opening by said discs when fastened to said foot in said disc recesses, said flange having a notch in an edge portion thereof and having two straight portions sloping away from a rounded peak diametrically opposite said notch, said flange straight portions disposed at angles equal to the angles of the straight edge portions of said foot, the end of said generally cylindrical portion opposite said flange having a plurality of vent notches therein, a side of said cylindrical portion toward said straight flange portions also having two flat areas sloping at the same angle as the flange straight portions and meeting along a rounded peak aligned with the flange peak and extending longitudinally of said cylindrical portion, said spark shield having a generally cylindrical passage extending therethrough and flaring outwardly at the end toward said flange.

2. A spark shield assembly for a stud welding tool comprising a supporting foot including a body having two major, flat surfaces and a peripheral edge, one of said surfaces having spaced means to receive fastener means for a pair of supporting legs of the stud welding tool, said body having an opening in an edge portion positioned symmetrically with respect to said receiving means, said opening having an arcuate edge extending through an included angle of more than 180°, said opening having a shoulder around said edge spaced a predetermined distance from the one surface of said body, a pair of discs having fasteners affixed to said body at said one surface at equal distances from the center of said opening, said discs having edge portions extending over said opening, said spark shield assembly further comprising a spark shield having a generally cylindrical portion and a flange portion at one end having a radius slightly less than the radius of said opening and fitting in said opening against said shoulder, said flange being held in said opening by said discs, said flange having a notch in a portion thereof and having two straight portions sloping away from a peak diametrically opposite said notch, said spark shield having a generally cylindrical passage extending therethrough.

3. A supporting foot for a stud welding tool comprising a body having two major, flat surfaces and a peripheral edge, one of said surfaces having spaced means to receive fastener means for a pair of supporting legs of the stud welding tool, said foot having an opening in an edge portion of said body positioned symmetrically with respect to said receiving means, said opening having an arcuate edge of a predetermined radius extending through an included angle of more than 180° and terminating at the peripheral edge of said foot, said opening having a shoulder around said edge spaced a predetermined distance from the one surface of said body, a pair of flange means having fasteners affixed to said foot at said one surface at equal distances from the center of said opening and with lines through said fasteners and said center forming angles in the order of 15° with a line through said center and parallel to said receiving means, said flange means having edge portions extending over said opening, said edge of said foot having straight portions sloping away from said opening at equal angles in the order of 15° with respect to said parallel line through said center of said opening.

4. A supporting foot for a stud welding tool comprising a body having two major, flat surfaces and a peripheral edge, one of said surfaces having spaced means to receive fastener means for a pair of supporting legs of the stud welding tool, said body having an opening in an edge portion positioned symmetrically with respect to said receiving means, said opening having an arcuate edge extending through an included angle of more than 180°, said opening having a shoulder around said edge which is intermediate both of said major surfaces of said body and is spaced a predetermined distance from the one surface of said body, said body having a pair of recesses in said one surface adjacent said opening, a pair of flange means having fasteners affixed to said body in said recesses at equal distances from the center of said opening, said flange means having edge portions extending over the edge of said opening.

5. A supporting foot for a stud welding tool comprising a body having two major, flat surfaces and a peripheral edge, one of said surfaces having spaced means to receive fastener means for a pair of supporting legs of the stud welding tool, said foot having an opening positioned symmetrically with respect to said receiving means, said opening having an edge of a predetermined radius, said opening having a shoulder around said edge which is intermediate both of said major surfaces and is spaced a predetermined distance from the one surface of said body, a pair of flange means having fasteners affixed to said foot symmetrically with respect to the center of said opening, said flange means having edge portions extending over said opening and effective to hold a portion of a spark shield in said opening in cooperation with said shoulder of said opening.

6. A supporting foot for a stud welding tool comprising a body having two major, flat surfaces and a peripheral edge, said body having means to receive fastener means for at least one supporting leg of the stud welding tool, said body having an opening, said opening having an edge of predetermined radius and having a shoulder around said edge spaced a predetermined distance from one surface of said body, said body having a pair of recesses in said one surface adjacent said opening, a pair of flange means having fasteners affixed to said body in said recesses at equal distances from the center of said opening, said flange means having edge portions extending over the edge of said opening and effective to hold a portion of a spark shield in said opening in cooperation with said shoulder of said opening.

7. A spark shield assembly for a stud welding tool comprising a spark shield having a generally cylindrical portion and a generally annular flange portion at one end of a predetermined radius, said flange having a notch in a portion thereof and having two straight portions sloping away from a rounded peak diametrically opposite said notch at angles of approximately 75° to a line through said notch and said peak, the end of said generally cylindrical portion opposite said flange having a plurality of notches therein, a side of said cylindrical portion toward said straight flange portions also having two flat areas sloping at the same angle as the flange straight portions and meeting along a rounded peak extending longitudinally of said cylindrical portion, said spark shield having a generally cylindrical passage extending therethrough and flaring outwardly at the end toward said flange.

8. A spark shield assembly for a stud welding tool comprising a spark shield having a generally cylindrical portion and a generally annular flange portion at one end of a predetermined radius, said flange having clearance means in a portion thereof and having two additional clearance means symmetrically located on each side of a peak diametrically opposite said first clearance means, the end of said generally cylindrical portion opposite said flange having a plurality of notches therein, a side of said cylindrical portion having two flat sloping areas meeting along a rounded peak extending longitudinally of said cylindrical portion, said spark shield having a generally cylindrical passage extending therethrough and flaring outwardly at the end toward said flange.

9. A spark shield assembly for a stud welding tool comprising a spark shield having a generally cylindrical portion and a flange portion at one end having a predetermined radius, an edge portion of said flange having a notch in a portion thereof and having two straight portions sloping away from a peak diametrically opposite said notch, said spark shield having a generally cylindrical passage extending therethrough.

10. A spark shield assembly for a stud welding tool comprising a spark shield having a generally cylindrical portion and a flange portion at one end having a predetermined radius exceeding the radius of said cylindrical portion of said spark shield, a peripheral edge portion of said flange having at least two peripherally-spaced clearance means extending generally radially outwardly over the length of said flange, said spark shield having a passage extending therethrough, and said cylindrical portion having vent means at the end opposite said flange portion.

11. A spark shield having a generally cylindrical portion and a flange portion at one end of a predetermined radius, the end of said generally cylindrical portion opposite said flange having a plurality of notches therein, a side of said cylindrical portion having two flat areas sloping from a peak extending longitudinally of said cylindrical portion, said cylindrical portion being thinner at said flat areas than at the remaining portions, said spark shield having a generally cylindrical passage extending therethrough.

12. A spark shield having a generally cylindrical portion and a flange portion at one end of a predetermined radius exceeding the radius of said cylindrical portion, a peripheral edge portion of said flange having clearance means facing generally radially outwardly, the end of said generally cylindrical portion opposite said flange having a plurality of notches therein, said spark shield having a generally cylindrical passage extending therethrough.

References Cited

UNITED STATES PATENTS

| | | | |
|---|---|---|---|
| 2,416,915 | 3/1947 | Evans | 219—98 |
| 2,727,971 | 12/1955 | Mowry | 219—136 |

RICHARD M. WOOD, *Primary Examiner.*

C. CHADD, *Assistant Examiner.*